Dec. 27, 1932.  A. R. KEMP  1,892,279
COMMUNICATION CABLE
Filed July 29, 1930
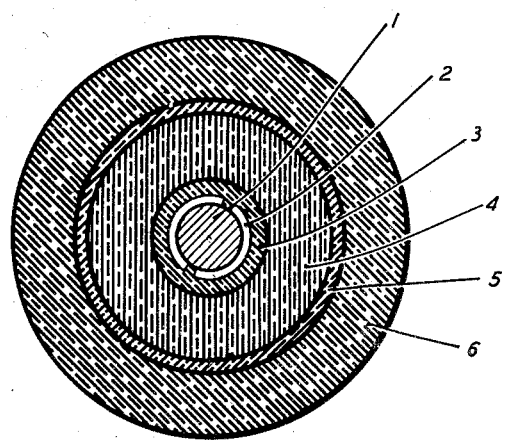
INVENTOR
A. R. KEMP
BY
J. W. Schmied
ATTORNEY Patented Dec. 27, 1932                                                1,892,279

UNITED STATES PATENT OFFICE

ARCHIE R. KEMP, OF WESTWOOD, NEW JERSEY, ASSIGNOR TO BELL TELEPHONE LABORATORIES, INCORPORATED, OF NEW YORK, N. Y., A CORPORATION OF NEW YORK

COMMUNICATION CABLE

Application filed July 29, 1930. Serial No. 471,602.

This specification relates to sub-aqueous cables employing pressure equalizing substances for the loading material thereof and/or adhesives for the insulation thereof.

This specification contains matter divided from application Serial No. 452,518 filed May 14, 1930, with other subject matter added.

In cable manufacture it has hitherto been suggested to apply bitumen, partially depolymerized rubber, or compositions consisting of paraffine mixed with rubber under and around the strain sensitive magnetic loading material of continuously loaded conductors.

An object of the present invention is to provide a pressure equalizing substance having a low leakance, a low dielectric constant, a low ratio of specific conductance to capacity, suitable physical properties and permanence of physical properties when in contact with thermoplastic insulation material for relatively long periods of time.

Pressure equalizing substances in accordance with the present invention comprise polymerized cyclic terpene hydro-carbons, (dipolymers or higher polymers) mixed with natural gums of composition $(C_5H_8)_n$ such as gutta percha, balata, rubber, or synthetic substitutes therefor. In particular, the composition composed of 50 to 75% of washed or deresinated balata may be combined with 50 to 25% of a composition known as "Dipolymer" prepared in accordance with the disclosure of one or more of the U. S. Patents to Humphrey, Nos. 1,691,065, 1,691,067, 1,691,068, 1,691,069 and 1,691,573, all granted on November 13, 1928. In general similar results may be obtained by employing polymers, and especially dipolymers of dipentene, turpentine, pine oil, or other terpene hydrocarbons or substitutes for terpene hydrocarbons. These polymerized bodies, in general, have a composition $(C_5H_8)_n$ and are derived from unsaturated cyclic hydro-carbons of a similar composition formula by a process of polymerization.

As pointed out in one or more of the Humphrey patents mentioned above, the product resulting from heating pine oil, for example, can be separated into several fractions. The fraction especially useful for the purposes of the present invention is that 80% of the material which boils off first and has a specific gravity of about 0.94. However, the invention is not limited to the use exclusively of this fraction of the material. Polymerized cyclic terpene hydro-carbon prepared by any suitable method may be employed as one of the ingredients of pressure equalizing compositions.

In preparing compositions in accordance with the invention the ingredients (polymerized hydro-carbon and gum) may be compounded either by stirring them together at 150° C., or by milling them on a slightly warmed rubber mill. Mixtures containing washed balata may be successfully prepared by stirring at 150° C., while those containing deresinated balata are preferably mixed on the rubber mill or in an internal mixer as otherwise they become spongy and lose their toughness. The consistency of the material may be controlled over a considerable range by varying the amount of dipolymer and the time of milling.

The electrical properties of representative compositions of this type at ordinary room temperature and 2000 cycles per second in comparison with a representative specimen of Chatterton's compound have been determined as follows:

Table

|  | Specific conductance in mhos per cm³ | $\frac{G}{C}$ | Dielectric constant (K) |
|---|---|---|---|
| Composition No. 1<br>Deresinated balata 70%<br>Dipolymer 30% | $1.75 \times 10^{-12}$ | 7.9 | 2.5 |
| Composition No. 2<br>Deresinated balata 75%<br>Dipolymer 25% | $1.84 \times 10^{-12}$ | 8.3 | 2.5 |
| Composition No. 3<br>Washed balata 75%<br>Dipolymer 25% | $3.43 \times 10^{-12}$ | 15.5 | 2.5 |
| Composition No. 4<br>Washed balata 50%<br>Dipolymer 50% |  | 17.9 |  |
| Composition No. 5<br>Stockholm tar 70%<br>Gutta percha 30% | $162 \times 10^{-12}$ | 556 | 3.3 |

In the above table G represents the leakance and C the capacitance of the materials.

The physical properties of such compositions as No. 1 to No. 4 given above are suitable for pressure equalizing purposes.

As stated above, one may use in the place of balata either washed or deresinated gutta percha, crude or deproteinized rubber, balata-like derivatives of rubber (artificial balata) prepared by treating rubber with sulphuric acid or sulphonic derivatives in accordance with the methods described in Fisher's U. S. Patent No. 1,605,180, granted November 2, 1926, and elsewhere, or mixtures of these substances.

In employing these compositions to make submarine cables magnetic loading material in the form of wire or tape may be applied to the cable conductor and heat treated in an ordinary manner. Before applying the main insulation the pressure equalizing substance is applied to the conductor so as to fill all of the interstices in, around and under the loading material and preferably to leave a layer of from five to ten thousandths of an inch on the outside. Loading coils may be filled with the material to protect the magnetic material in the coils from strain.

In accordance with another feature of the invention the new compositions mentioned above are employed as an adhesive between the several layers of thermoplastic insulating material of a cable.

In cable manufacture it is customary to apply insulation, especially upon deep sea signaling cables, in several layers which are cemented together by a compound known as Chatterton's compound. A typical specimen of Chatterton's compound as used in the past consists of about 70% Stockholm tar mixed with 30% gutta percha. Occasionally colophony or rosin is included in Chatterton's compound. Typical compositions of Chatterton's compound, with or without rosin have a high leakance, high dielectric constant and high ratio of specific inductance to capacity. Such electrical properties have not heretofore been especially important in low frequency signaling cables and with types of insulation heretofore employed. However, with higher frequencies such as carrier and speech frequencies the necessity for an adhesive with better electrical properties between the layers of insulation has arisen. Furthermore, improvements in insulation have increased the contrast between the properties of the insulation and of the adhesives used heretofore. For this reason the advantage to be obtained with an adhesive of superior electrical properties at all frequencies is increased.

In addition to being a suitable pressure equalizing substance compositions such as herein mentioned have electrical and physical properties suitable for use as an adhesive for application between layers of insulation. After applying one layer of insulation a thin film of adhesive is applied and the next layer of insulation is thereby caused to adhere in a more satisfactory manner. The dielectric constant, specific conductance, and a ratio $\frac{C}{G}$ of compositions such as herein described have values far superior to Chatterton's compound.

These compositions may also be used for impregnating unloaded conductors and for causing insulating material to adhere thereto more firmly.

The same cable may have a continuously loaded conductor impregnated and surrounded with a pressure equalizing composition such as herein described and the insulation may be applied in several layers with one of the new adhesive compositions, herein described, used between the layers as an adhesive.

A cable core in accordance with the invention is illustrated in the drawing.

Referring to the drawing, the central conductor 1 is surrounded by a magnetic loading tape 2 which, in turn, is surrounded and underlaid with pressure equalizing material 3 which is composed of polymerized cyclic terpene hydro-carbon mixed with a gum of composition $(C_5H_8)_n$ prepared as hereinbefore stated. The layer of insulation 4 and the layer of insulation 6 have between them a thin cementing layer of insulation 5 which also consists of a mixture of polymerized hydrocarbon and gum prepared as previously stated.

What is claimed is:

1. A submarine cable having magnetic material for increasing the inductance, and in which, for relieving the magnetic material from strains due to pressure and bending, it is impregnated, filled or surrounded with a pressure equalizing compound characterized in that the pressure equalizing compound comprises a polymerized cyclic terpene hydro-carbon mixed with a gum (including natural gum and synthetic substitutes therefor) composed largely of hydro-carbon of composition $(C_5H_8)_n$.

2. A submarine cable having insulation applied thereto in several layers with an adhesive composition between the layers, characterized in that the adhesive composition consists of polymerized cyclic terpene hydrocarbon mixed with a gum (including natural gum and synthetic substitutes therefor) composed largely of hydro-carbon of composition $(C_5H_8)_n$.

3. A submarine cable in accordance with claim 1, in which the gum constituent of the pressure equalizing substance consists principally of the hydro-carbon characteristic of gutta percha and balata.

4. A submarine cable in accordance with claim 1, characterized in that the gum constituent of the pressure equalizing substance consists of deresinated balata.

5. A submarine cable in accordance with claim 1, characterized in that the gum constituent of the pressure equalizing substance includes a portion of rubber.

6. A submarine cable in accordance with claim 1, characterized in that the gum constituent includes any proportion of artificial balata.

7. A submarine cable in accordance with claim 1, characterized in that the polymerized hydro-carbon of the pressure equalizing composition consists of polymerized turpentine or pine oil.

8. A submarine cable in accordance with claim 2, characterized in that the gum constituent of the adhesive composition consists of any proportion of the hydro-carbon characteristics of gutta percha and balata.

9. A submarine cable in accordance with claim 2, characterized in that the gum constituent of the adhesive composition contains a proportion of rubber.

10. A submarine cable in accordance with claim 2, characterized in that the polymerized hydro-carbon of the adhesive composition comprises polymerized turpentine or pine oil.

11. A submarine cable having magnetic material for increasing the inductance, and in which for relieving the magnetic material from strains due to pressure and bending it is impregnated, filled or surrounded with a pressure equalizing compound characterized in that the pressure equalizing compound comprises a dipolymerized cyclic terpene hydro-carbon, mixed with a gum (including natural gum and synthetic substitutes therefor) composed largely of hydro-carbon of composition $(C_5H_8)_n$.

In witness whereof, I hereunto subscribe my name this 25th day of July, 1930.

ARCHIE R. KEMP.